(12) United States Patent
Beche et al.

(10) Patent No.: US 9,784,823 B2
(45) Date of Patent: Oct. 10, 2017

(54) PANORAMIC DEVICE FOR DETECTION OF LASER PULSES

(75) Inventors: Arnaud Beche, Voisins le Bretonneux (FR); Bertrand Forestier, Paris (FR); Ludovic Perruchot, Bonnelles (FR)

(73) Assignee: THALES, Courbevoie (FR)

(*) Notice: Subject to any disclaimer, the term of this patent is extended or adjusted under 35 U.S.C. 154(b) by 566 days.

(21) Appl. No.: 13/989,791

(22) PCT Filed: Nov. 25, 2011

(86) PCT No.: PCT/EP2011/071053
§ 371 (c)(1),
(2), (4) Date: Jul. 2, 2013

(87) PCT Pub. No.: WO2012/069644
PCT Pub. Date: May 31, 2012

(65) Prior Publication Data
US 2013/0284952 A1    Oct. 31, 2013

(30) Foreign Application Priority Data

Nov. 26, 2010  (FR) ..................... 10 04602

(51) Int. Cl.
*G01S 7/495*  (2006.01)
*G01S 7/48*   (2006.01)

(52) U.S. Cl.
CPC ............ *G01S 7/495* (2013.01); *G01S 7/4804* (2013.01)

(58) Field of Classification Search
CPC ........ G01S 7/495; G01S 7/4804; G01S 17/48; G01S 7/491; G01S 11/12; G01S 5/16; G01S 17/89; G01S 17/42; G01J 1/04; G01J 5/34; G01J 5/20; G01J 5/02; G01J 5/08; G01J 3/02; G01J 3/2803; G01J 3/36; G01J 3/2823; H01L 27/14665; H01L 27/14643; H01L 27/14609; H01L 31/0232; H01L 31/09; H01L 37/02; H01L 27/14649; G08B 13/19; G08B 13/191; H04N 5/33;

(Continued)

(56) References Cited

U.S. PATENT DOCUMENTS 3,804,525 A     4/1974  Caudill
5,243,179 A *   9/1993  Bjorkman ............... 250/206.2

FOREIGN PATENT DOCUMENTS

EP    0236035 A2   9/1987
FR    2145712      2/1973
GB    2151871 A1   7/1985

OTHER PUBLICATIONS

D. Goular, et al., "Off Axis Laser Warning Sensor", Laser Radar Technology and Applications XIV—Proc. of SPIE, Apr. 15, 2009, pp. 732314-1 thru 732314-8, vol. 7323, XP002656997.

* cited by examiner

*Primary Examiner* — Renee Chavez
(74) *Attorney, Agent, or Firm* — Baker & Hostetler LLP

(57) ABSTRACT

A panoramic device for detection of laser pulses is provided, sensitive to at least two wavelengths and including a plurality of optical channels and a set of linear sensor arrays, each linear sensor array including a photosensitive area. Each optical channel includes at least two linear sensor arrays, the respective photosensitive areas of said at least two linear sensor arrays being non-contiguous, so that said at least two linear sensor arrays of each optical channel observe non-contiguous angular fields. Moreover, the optical channels are optically juxtaposed to obtain a continuous angular field of surveillance.

11 Claims, 4 Drawing Sheets

(58) Field of Classification Search
CPC . H04N 5/332; G01C 3/08; G01C 3/10; G01C 3/02; G01C 15/002; G01C 3/085
USPC ...... 250/578.1, 214.1, 214 VT, 338.1, 338.4, 250/339.01, 339.02, 339.05; 356/3.01, 356/3.02, 3.13, 4.01
See application file for complete search history.

PANORAMIC DEVICE FOR DETECTION OF LASER PULSES

CROSS-REFERENCE TO RELATED APPLICATIONS

This application is a National Stage of International patent application PCT/EP2011/071053, filed on Nov. 25, 2011, which claims priority to foreign French patent application No. FR 1004602, filed on Nov. 26, 2010, the disclosures of which are incorporated by reference in their entirety.

FIELD OF THE INVENTION

The present invention relates to the field of the detection of laser beams, for use in the field of the defense of large structures such as buildings, ground installations, or vessels in the naval domain in particular.

To be more precise, the device in accordance with the present invention is able to detect "laser aggression" such as range-finder laser pulses or missile guidance system laser pulses over a range of 360° in bearing and several tens of degrees in elevation.

BACKGROUND

This type of device is routinely designated by the term DAL standing for Warning laser sensor (in French: Détecteur d'Alerte Laser).

Because laser pulses have a very short duration, and also for reasons of photometric balance, it is commonly accepted in the prior art that, in order to achieve satisfactory sensitivities, DAL must include sensors having an output for each element, whether it is a question of mono-element sensors or sensors comprising groups of mono-elements taking the form of linear sensor arrays having one output for each elementary sensor.

Consequently, as is known in the art, such devices have a large overall size because they include optics for collecting the flux for each sensor or linear sensor array.

Another drawback of this type of DAL lies in the fact that even though they may be sensitive to different wavelengths, typically from approximately 1.06 µm to 1.5 µm, they are not able to distinguish between said wavelengths, which can be a major operational problem because the type of threat cannot be identified.

Such DAL including an optical channel for each linear sensor array are described in the prior art. Thus an "off-axis" DAL is described in a paper published by D. Goular et al. entitled "Off-Axis Warning Laser Sensor" in the journal "Proceedings of SPIE, the International Society for Optical Engineering". As indicated above, this DAL has the drawbacks of a very large overall size and an inability to distinguish the wavelengths of detected laser pulses.

SUMMARY OF THE INVENTION

One object of the invention is notably to alleviate the aforementioned drawbacks and thus to reduce the number of optical channels necessary. Accordingly, to reduce the overall size of the device, the present invention proposes a DAL sensitive to at least two wavelengths having, in the focal plane of each optical channel, two linear sensor arrays sensitive to said two wavelengths separated from each other in order to observe separate angular fields; moreover, the different optical channels are juxtaposed so as to create a continuous panoramic coverage.

Accordingly, the invention consists in a panoramic device for detection of laser pulses sensitive to at least two wavelengths and including a plurality of optical channels and a set of linear sensor arrays, each linear sensor array including a photosensitive area. The device in accordance with the invention is characterized in that at least one optical channel includes at least two linear sensor arrays, the respective photosensitive areas of said at least two linear sensor arrays being non-contiguous so that said at least two linear sensor arrays in each optical channel observe non-contiguous angular fields.

The optical channels are advantageously optically juxtaposed and together cover a continuous angular field.

Each optical channel including a pupil through which light beams enter said optical channel and optical means for guiding said light beams in said optical channel, the optical juxtaposition of said optical channels may advantageously be obtained by means of an appropriate configuration:
- of the dimensions of the linear sensor arrays, in particular their width and their height;
- of the distance between the centers of two linear sensor arrays of an optical channel;
- of the characteristics of said optical means, in particular their aperture and their focal distance.

The optical channels are advantageously disposed side-by-side, the linear sensor arrays of one optical channel having relative to the linear sensor arrays of another optical channel an angular inclination along a longitudinal axis, said angular inclinations being configured so that all the optical channels are juxtaposed and together cover a continuous angular field.

The device being sensitive to two wavelengths, each optical channel advantageously includes means for separating said two wavelengths.

Said at least two linear sensor arrays are advantageously double linear arrays, i.e. linear arrays comprising two columns of sensors, in which one of the columns of sensors includes a filter for one of said two wavelengths constituting the means for separating said at least two wavelengths.

Alternatively, a dichroic plate is advantageously disposed on the upstream side of each of said at least two linear sensor arrays, constituting the means for separating said at least two wavelengths.

Said linear sensor arrays are advantageously made of InGaAs.

The device in accordance with the invention may advantageously include linear sensor arrays made of Si for the detection of laser pulses at a first wavelength and linear sensor arrays made of InGaAs for the detection of laser pulses at a second wavelength.

Each linear sensor array advantageously includes a protective window for protecting its photosensitive area.

Each optical channel advantageously includes a pupil through which light beams enter said optical channel.

A bi-spectral filter may advantageously be disposed on the upstream side of said pupil so that only light beams having a first or second wavelength can enter the corresponding optical channel.

A mono-spectral filter may advantageously be disposed on the upstream side of at least one linear sensor array in each optical channel so that this linear sensor array is sensitive to only one wavelength.

BRIEF DESCRIPTION OF THE DRAWINGS

Other features and advantages of the invention will become apparent in the light of the following description with reference to the appended drawings, which represent.

DETAILED DESCRIPTION

Figure 1:
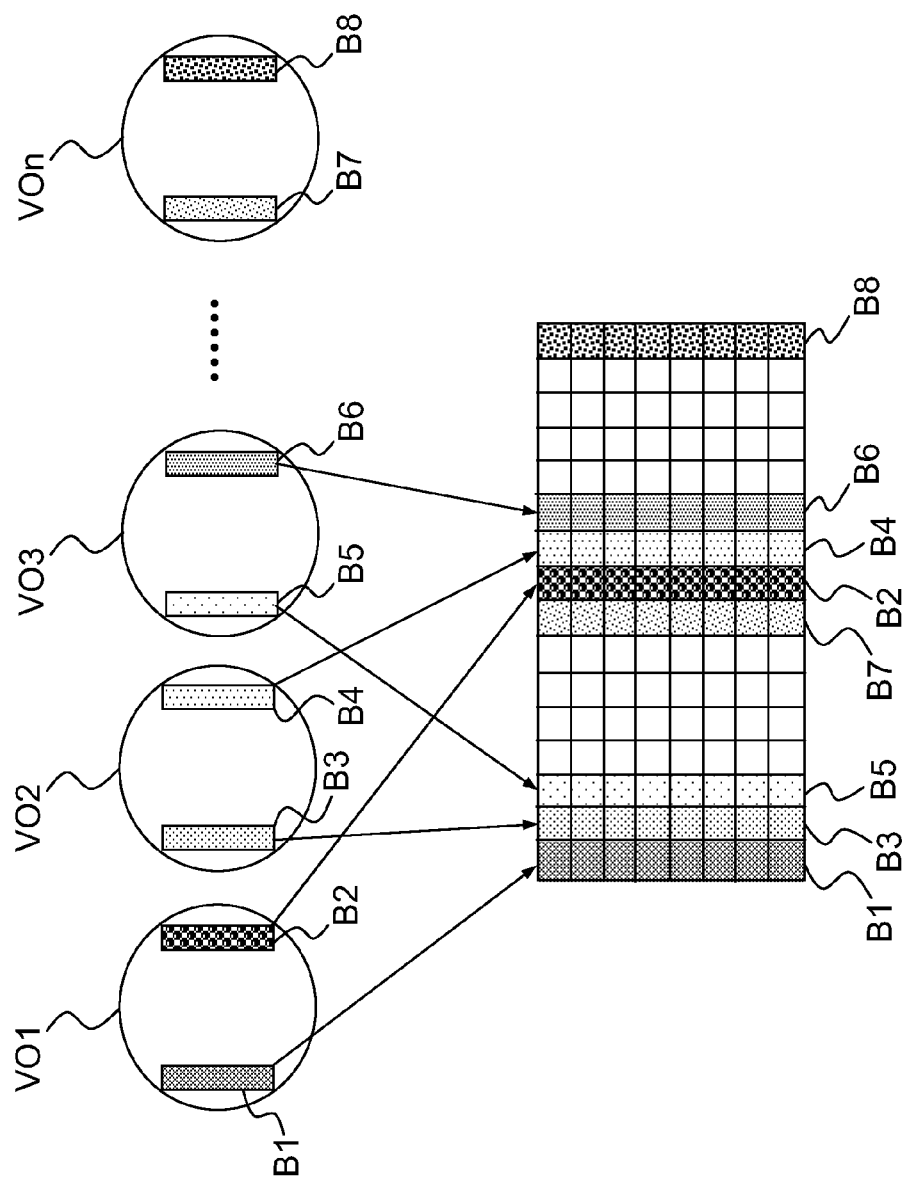
FIG. 1: a theoretical schematic of a warning laser sensor in accordance with the invention.

FIG. 1 shows a schematic of a DAL or Warning laser sensor (in French: Détecteur d'Alerte Laser) including a plurality of optical channels VO1, VO2, VO3, VOn each consisting of two linear sensor arrays, respectively B1-B2, B3-B4, B5-B6, B7-B8.

As is clearly apparent in FIG. 1, the device in accordance with the invention is such that, in each optical channel VO1, the linear sensor arrays B1-B2 of each optical channel are disposed in a non-contiguous fashion. In the preferred embodiment of the invention, the two linear sensor arrays B1-B2 of each optical channel VO1 are sensitive to at least two wavelengths, so that they are able to detect laser pulses at said two wavelengths.

Accordingly, in each optical channel, two linear sensor arrays observe different elementary angular fields.

Figure 2:
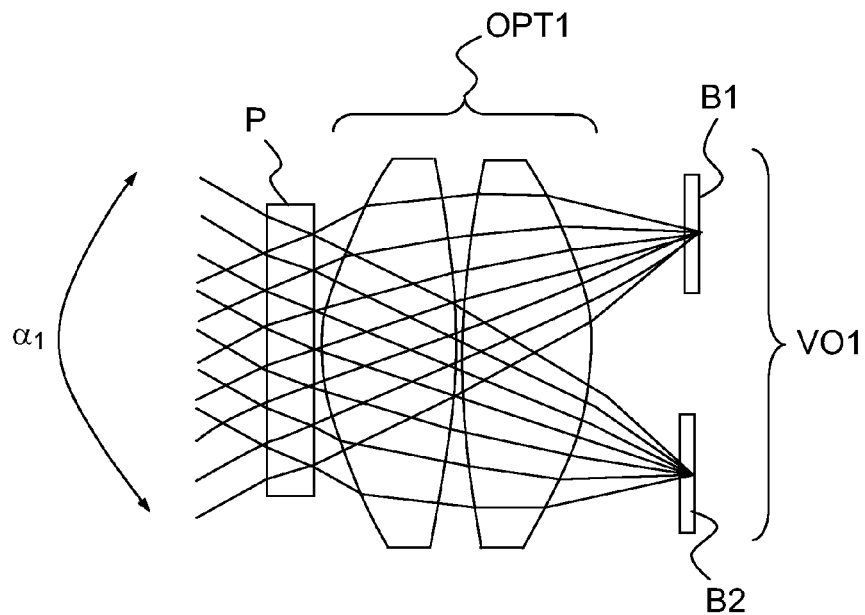
FIG. 2: a schematic representation of the angular field covered by an optical channel in the sensor in accordance with the invention.

As FIG. 2 shows, such an arrangement enables each optical channel VO1 to cover a distance in terms of bearing between the centers of the two linear sensor arrays of an optical channel that is twice as large as if there were only one linear array in each optical channel, which distance is referred to for simplicity as the angular field ALPHA1.

In accordance with the invention, the different optical channels are configured to be optically juxtaposed. To this end, the dimensions of the linear sensor arrays, in particular their width and the distance between the centers of the linear sensor arrays of an optical channel, are chosen appropriately. Moreover, optical means, such as lenses, disposed in each optical channel are also configured appropriately. To obtain this optical juxtaposition of the different optical channels of the device, the optical channels have an appropriate angular offset relative to each other. The angular offset between two optical channels is equal to the angular field ALPHA1 divided by the number of optical channels. The number of optical channels is chosen so that this angular offset is less than or equal to the instantaneous field of view (IFOV) of a linear array in terms of bearing, in order for there to be no "gap" in the angular coverage.

The juxtaposition is thus simply effected by means of the mechanical mounting of the optical channels, by adjustment screws for precisely adjusting the angular orientation of each optical channel in elevation and in bearing. The means for optically juxtaposing the channels are known in the art.

As a result, the DAL device in accordance with the invention enables a continuous surveillance "linear array" to be obtained. Moreover, the bi-spectral capability of the linear sensor arrays enables detection of different types of laser threat. In order to discriminate between the different wavelengths detected, the device in accordance with the invention may include the improvements described hereinafter.

By way of nonlimiting example, the following configuration is given for an optical channel of a DAL in accordance with the invention on the basis of the example from FIG. 2:

The linear sensor arrays B1, B2 are made of InGaAs, and may be Hamamatsu G7150-16 linear arrays. Such linear arrays have an instantaneous field of view (IFOV) corresponding to pixel sizes of 1 mm in bearing and 0.9 mm in elevation; these linear arrays have a height of 7.2 mm—corresponding to the elevation—and the distance between the centers of the linear arrays is 16 mm—corresponding to the bearing.

The optical means for causing the light beams to enter the optical channel and guiding them toward the linear sensor arrays B1, B2 include a 15 mm diameter pupil provided with an interference filter for the wavelengths looked for—typically 1.06 μm and 1.5X μm—and two lenses OPT1 that may be made of molded glass or of injected-molded ZEONEX 330R plastic.

Such a module—corresponding to an optical channel—has a coverage field constituted of two linear arrays of 3.8° in bearing and 27° in elevation, with a centre-to-centre angular distance ALPHA1 of 61°.

As shown in the figures, an optical channel includes a single pupil dedicated to the two linear arrays.

Figure 3:
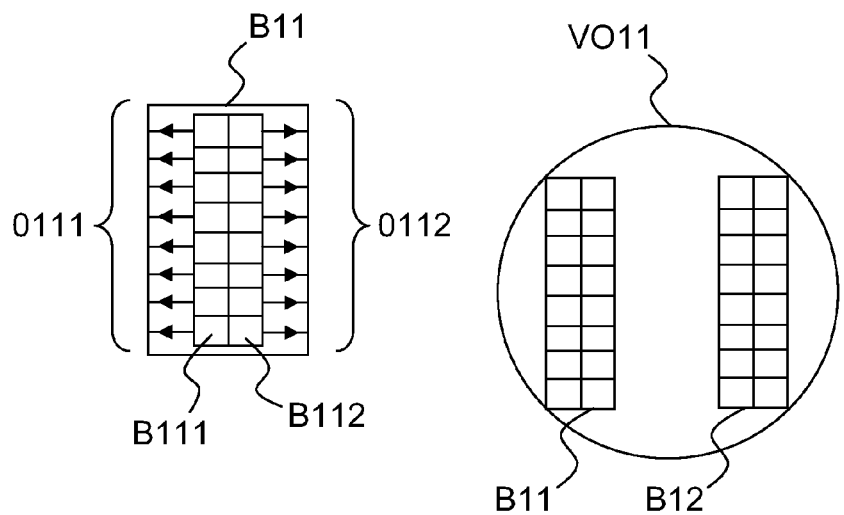
FIG. 3: a schematic of a double linear sensor array.

FIG. 3 represents a first embodiment of the invention having a bi-spectral capability and the capability to distinguish the two wavelengths detected. To this end, each optical channel VO11 comprises two double linear sensor arrays B11, B12. Each double linear array B11 is constituted of two contiguous sensor columns B111, B112 sensitive to two different wavelengths. The sensor column B111 may typically be sensitive to the wavelength 1.06 μm and the sensor column B112 may typically be sensitive to the wavelength 1.5X μm. In this case, one of the columns of sensors B111 may be provided with an appropriate spectral filter. Note that in FIG. 3 the sensor columns B111, B112 can easily be wired independently of each other, as the outputs O111, O112 show.

Again to obtain the capability to distinguish the two wavelengths, another technology consists in using dichroic plates D1, D2, as represented in FIGS. 4a-4b and 5a-5b. The latter plates are adapted to separate the wavelengths by reflecting rays corresponding to a given wavelength and allowing to pass through them rays corresponding to another wavelength.

Figure 4A:
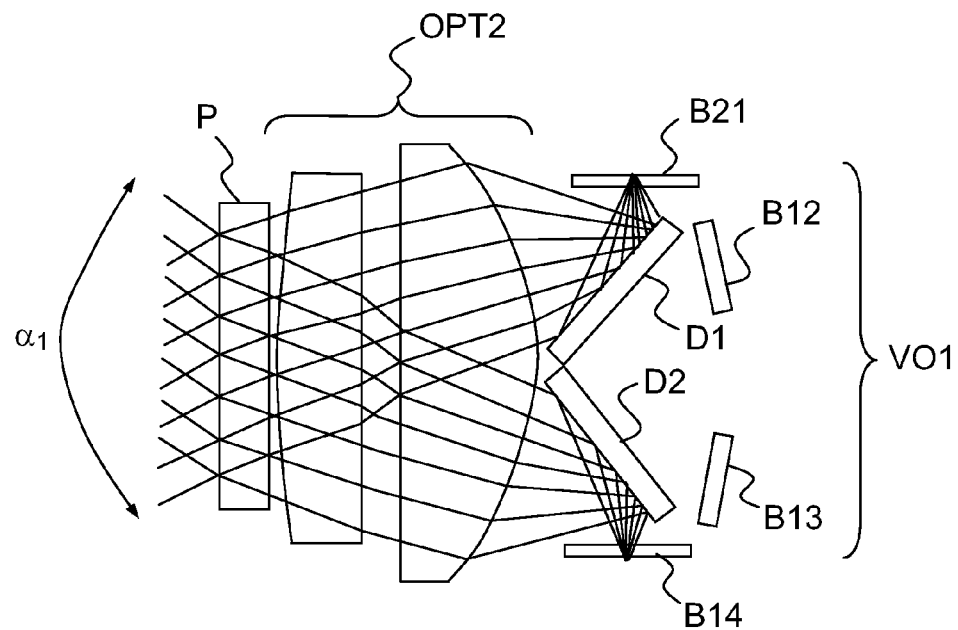
FIGS. 4a and 4b: schematics of a device in accordance with a first embodiment of the invention provided with a dichroic plate for separating the wavelengths of the detected laser pulses.
Figure 4B:
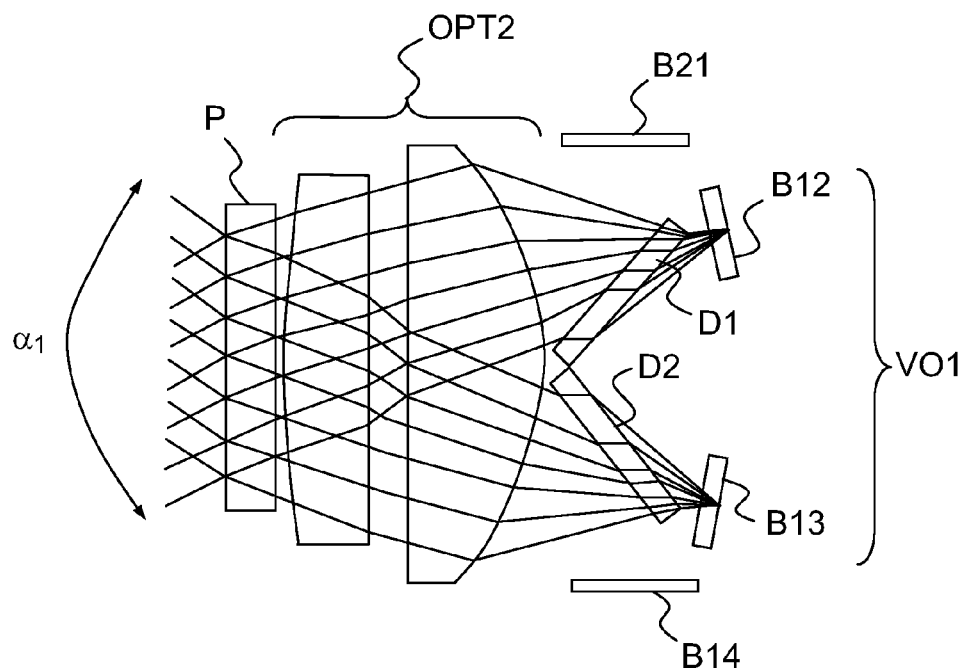

In the embodiment shown in FIGS. 4a-4b, each optical channel comprises four separate linear sensor arrays B21, B22, B23, B24 and dichroic plates D1, D2. Disposed appropriately behind the optics OPT2, which in the optical channel concerned guide a set of light beams captured via the pupil P, the dichroic plates D1, D2 are adapted to reflect a first portion of the light beams having a first wavelength, typically 1.06 μm, toward first linear sensor arrays B21, B24, which may be made of Si or InGaAs. In a preferred embodiment, these linear arrays B21, B24 include a protective window adapted to protect the photosensitive areas of said linear arrays.

Moreover, the dichroic plates D1, D2 are adapted to allow a second portion of the light beams, having a second wavelength, typically 1.5X μm, to pass through them toward second linear sensor arrays B22, B23, which may be made of InGaAs. In a preferred embodiment, these linear arrays B22, B23 include a protective window adapted to protect the photosensitive areas of said linear arrays.

In this example, the four linear sensor arrays B21 to B24 have the same dimensions.

Figure 5A:
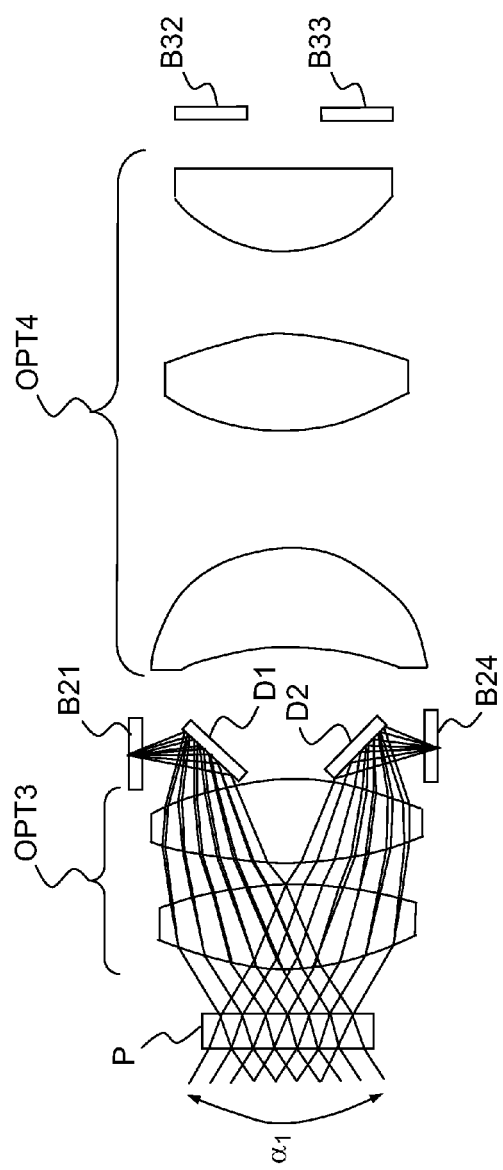
FIGS. 5a and 5b: schematics of a device in accordance with a second embodiment of the invention provided with a dichroic plate for separating the wavelengths of the detected laser pulses.
Figure 5B:
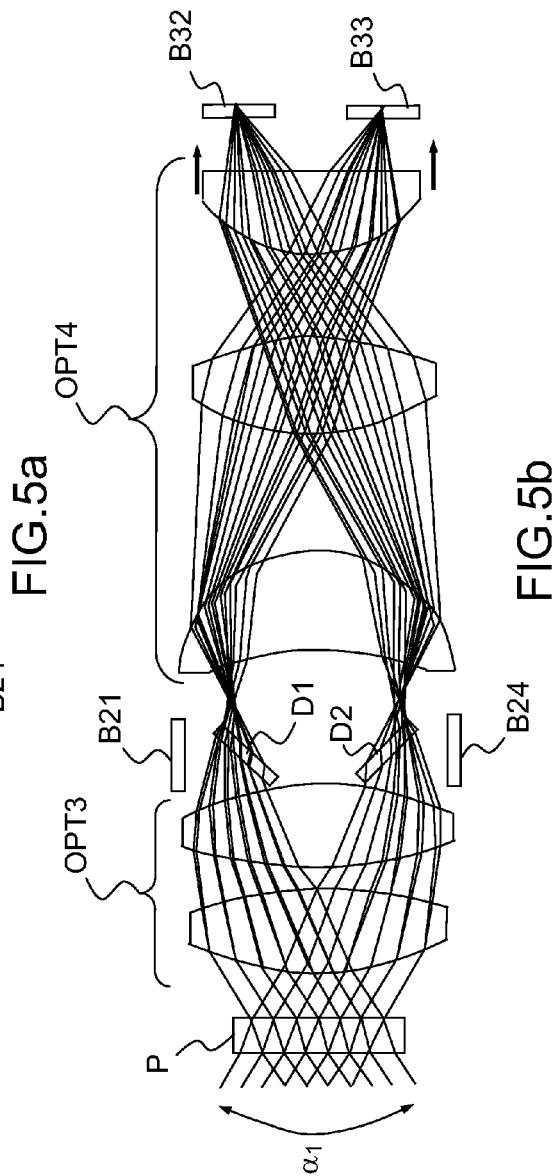

In the embodiment shown in FIGS. 5a-5b, the device in accordance with the invention again includes two dichroic plates D1, D2. In this example, however, the linear arrays used for the detection of laser pulses at the first wavelength, typically 1.06 µm, are made of Si and have dimensions different from those used for the detection of laser pulses at the second wavelength, typically 1.5X µm, which are made of InGaAs. For example, the linear sensor arrays made of Si are Hamamatsu S4111-16 linear arrays that comprise 16 pixels with sizes of 1.45 mm in bearing and 1.0 mm in elevation and the linear sensor arrays made of InGaAs are Hamamatsu G7150-16 linear arrays that comprise 16 pixels with sizes of 1.0 mm in bearing and 0.45 mm in elevation.

In this case, for the angular coverage to be the same for both wavelengths, the device includes different optics OPT3, OPT4 for each type of linear array, respectively B21-B24 and B32, B33. In this case, the optics OPT4 constitute an enlargement module disposed in front of the linear sensor arrays made of InGaAs whereas the optics OPT3 constitute an objective common to the two types of linear array.

Note that, regardless of the embodiment, the DAL device in accordance with the invention may preferably include on the upstream side of the pupil P an interference filter common to the two wavelengths to be detected, i.e. in the preferred embodiment envisaged here the wavelengths of 1.06 µm and 1.5X µm. Alternatively, this bi-spectral filter may be replaced with mono-spectral filters disposed in front of each linear sensor array or in front of each column of sensors in the case of double linear arrays.

To summarize, the present invention has the principal advantage of proposing a warning laser sensor architecture of reduced overall size enabling panoramic surveillance around large structures such as buildings, ground installations, or vessels in the naval domain with a view to detecting laser threats at two separate wavelengths which the preferred embodiments of the device in accordance with the invention can discriminate.

The invention claimed is:

1. A panoramic device for detection of laser pulses, sensitive to at least two wavelengths, comprising:
   a plurality of optical channels; and
   a set of linear sensor arrays, each linear sensor array including a photosensitive area,
   each optical channel including:
      a pupil through which light beams enter said each optical channel, and optical means for guiding said light beams in said each optical channel toward a focal plane,
   wherein at least one optical channel in the plurality of optical channels includes:
      at least two linear sensor arrays in a focal plane of said at least one optical channel, the respective photosensitive areas of said at least two linear sensor arrays in the at least one optical channel being non-contiguous in bearing,
   the optical means of the at least one optical channel being configured to guide said light beams toward said at least two linear sensor arrays in the at least one optical channel, such that said at least two linear sensor arrays in the at least one optical channel observe non-contiguous angular fields, and
   wherein respective images sensed by the set of linear sensor arrays are interleaved to cover together a continuous angular field.

2. The panoramic device as claimed in claim 1, wherein the respective images are interleaved by means of:
   dimensions of the linear sensor arrays, in particular a width and a height of each of said linear sensor arrays;
   a distance between centers of two linear sensor arrays of an optical channel; and
   characteristics of said optical means, including an aperture and a focal distance of each of said optical means.

3. The panoramic device as claimed in claim 1, wherein the plurality of optical channels are disposed side-by-side, the linear sensor arrays of the at least one optical channel having an angular inclination along a longitudinal axis relative to the linear sensor arrays of another optical channel, said angular inclinations being configured such that the respective images are interleaved to cover together the continuous angular field.

4. The panoramic device as claimed in claim 1, sensitive to at least two wavelengths, wherein said each optical channel includes means for separating said at least two wavelengths.

5. The panoramic device as claimed in claim 4, wherein said at least two linear sensor arrays in the at least one optical channel are double linear arrays including two columns of sensors, in which one of the columns of sensors includes a filter for one of said at least two wavelengths, said filter constituting the means for separating said at least two wavelengths.

6. The panoramic device as claimed in claim 5, further including a dichroic plate disposed on an upstream side of each of said at least two linear sensor arrays, said dichroic plate constituting the means for separating said at least two wavelengths.

7. The panoramic device as claimed in claim 1, wherein said linear sensor arrays are made of Indium Gallium Arsenide (InGaAs).

8. The panoramic device as claimed in claim 1, wherein the set of linear sensor arrays includes linear sensor arrays made of Silicon (Si) configured to detect laser pulses at a first wavelength and linear sensor arrays made of Indium Gallium Arsenide (InGaAs) configured to detect laser pulses at a second wavelength.

9. The panoramic device as claimed in claim 1, wherein said each linear sensor array includes a protective window for protecting the photosensitive area of said each linear sensor array.

10. The panoramic device as claimed in claim 1, wherein a bi-spectral filter is disposed on an upstream side of said pupil such that only light beams having a first or a second wavelength can enter the corresponding optical channel.

11. The panoramic device as claimed in claim 1, wherein a mono-spectral filter is disposed on an upstream side of at least one linear sensor array such that the at least one linear sensor array is sensitive to only one wavelength.

* * * * *